Oct. 31, 1944.    E. R. KOPPEL    2,361,636
CONNECTION FOR HOT WATER TANKS
Filed Aug. 20, 1942
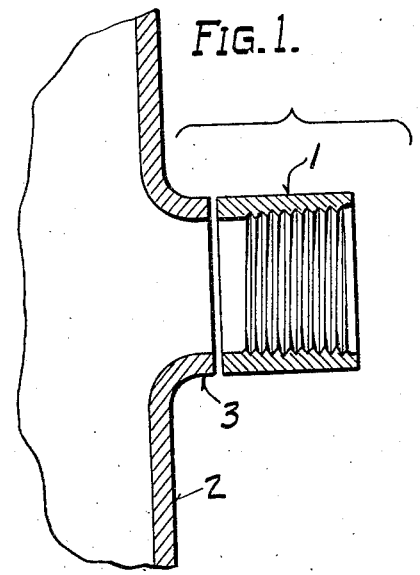
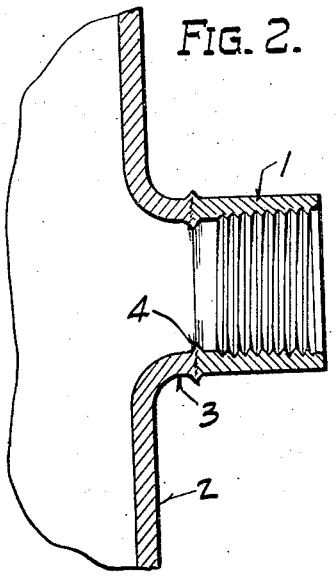
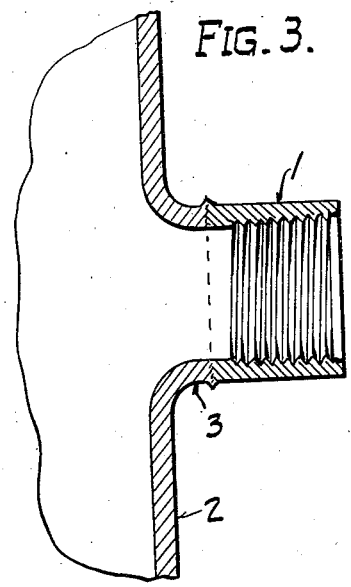
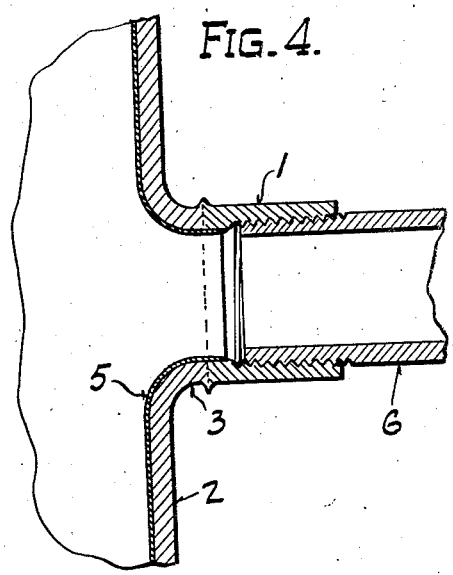
Ernst R. Koppel
INVENTOR.
BY *Elwin A. Andrus*
ATTORNEY.

Patented Oct. 31, 1944

2,361,636

UNITED STATES PATENT OFFICE 2,361,636

CONNECTION FOR HOT-WATER TANKS

Ernst R. Koppel, Milwaukee, Wis., assignor to A. O. Smith Corporation, Milwaukee, Wis., a corporation of New York Application August 20, 1942, Serial No. 455,411

3 Claims. (Cl. 285—106)

This invention relates to a connection for hot water tanks lined with vitreous ceramic enamel or the like.

The principal object of the invention is to provide a welded connection in which the metal of the wall of the tank is protected from corrosion by the enamel extending over the welded joint.

The invention is embodied in a corrosion resistant alloy tubular connection flash welded to a flange in the wall of the tank and with the weld smoothed off on the inside and the enamel lining of the tank extending over the weld so that it completely protects the steel of the tank wall.

By the use of the connection all packings and similar means for protecting the metal parts at the connection are eliminated. Furthermore, it is unnecessary to attempt to cover the connection with the lining material since the connection is of corrosion resistant alloy.

The accompanying drawing illustrates a connection embodying the invention, and in the drawing:

Figure 1 is a sectional view through a portion of a tank wall and of a connection prior to welding;

Fig. 2 is a similar section after welding;

Fig. 3 is a similar section showing the parts prepared for enameling; and

Fig. 4 is a similar section showing the completed connection.

The connection illustrated has a cylindrical tubular member 1 of corrosion resistant alloy such as stainless steel, threaded internally or externally at its outer end either before or after assembly to the tank to connect to a pipe. The tank wall 2 of ordinary steel has an opening therein with its edge curved outwardly to provide a flange 3 having its outer end dimensions approximately the same as those of the inner end of member 1.

In constructing the connection, the alloy member 1 is first butt welded to the end of flange 3 as by electric flash welding. This results in a flash or bur 4 on the inside of the weld line as illustrated in Fig. 2. The flash 4 is cut or ground away and the interior of the joint smoothed as illustrated in Fig. 3. Then the tank is lined with a vitreous ceramic enameling material and fired at a suitable fusing temperature for the enamel, such as 1650° F.

The enamel lining 5 produced in the manner described extends over the welded joint and is bonded to the metal of the member 1 so that none of the metal of the tank wall 2 or flange 3 is exposed to corrosion from the contents of the tank. The curvature of the flange 3 should have a large radius to provide for good enameling conditions.

The member 1, being integral with the tank wall, provides a strong connection for a pipe 6 to the tank. The alloy employed for member 1 should have a thermal coefficient of expansion as close as possible to that of the tank material.

Various embodiments of the invention are within the scope of the accompanying claims.

The invention is claimed as follows:

1. In a pipe connection for a tank wall, a tubular corrosion resistant alloy connecting member butt welded to the end of a tubular flange surrounding an opening in the tank wall, and a corrosion resistant lining bonded to the tank wall and flange and extending over the weld line to bond with the alloy member and prevent exposure of the metal of the tank to the fluid contents thereof said lining being integrally and continuously bonded to the inner surfaces of said tank and member covered thereby.

2. In a pipe connection for a steel tank, a tubular corrosion resistant alloy connecting member butt welded to the end of a tubular flange surrounding an opening in the tank wall, and a ceramic enamel lining fused and bonded to the wall of the tank and extending over the weld line of the connection to bond with the inner surface of the alloy member and prevent exposure of the metal of the tank to the fluid contents thereof.

3. A pipe connection for a ceramic enamel lined steel tank containing corrosive fluids, comprising a corrosion resistant alloy connecting member having a coefficient of thermal expansion substantially the same as that of said tank butt welded to the end of a tubular flange surrounding an opening in the tank wall, the ceramic lining for said tank extending over said welded joint and being integrally and continuously bonded to the inner surface of said tank and of said member covered thereby.

ERNST R. KOPPEL.